Dec. 9, 1952      R. O. BARNHART      2,620,835
GUIDE FOR PORTABLE CUTOFF SAWS

Filed July 21, 1950

INVENTOR.
Roy Barnhart
BY
ATTORNEYS.

Patented Dec. 9, 1952

2,620,835

UNITED STATES PATENT OFFICE 2,620,835

GUIDE FOR PORTABLE CUTOFF SAWS

Roy O. Barnhart, Wenatchee, Wash.

Application July 21, 1950, Serial No. 175,225

1 Claim. (Cl. 143—6)

My invention relates to a guide for portable power saws.

A primary object of the invention is to provide a portable power saw guide which is highly simplified in construction, reliable and efficient in operation, sturdy and durable and inexpensive to manufacture.

A further object is to provide a hand-operated power saw guide which greatly facilitates cutting rafters and the like, the guide being adjustable for providing the desired pitch on the rafters A still further object is to provide a saw guide of the above-mentioned character which embodies a minimum number of simplified parts which are easy to make, and furnishing reliable and efficient means for cutting off work at the desired angle.

Other objects and advantages of the invention will be apparent during the course of the following description.

Figure 1:
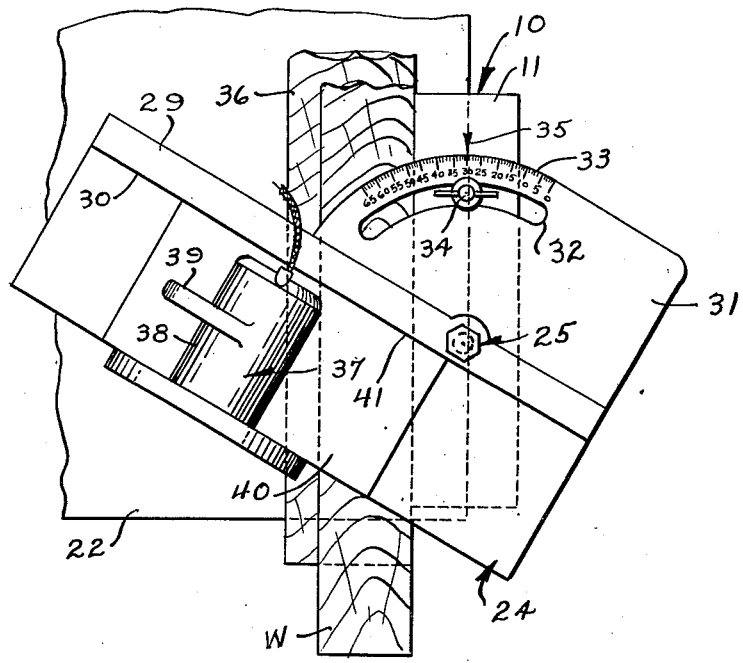
Figure 2:
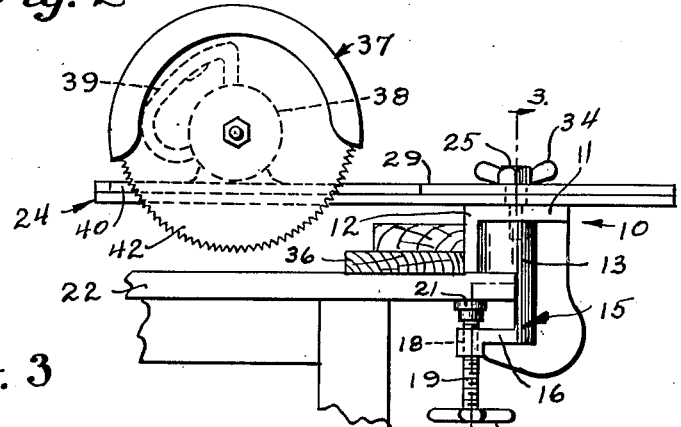
Figure 3:
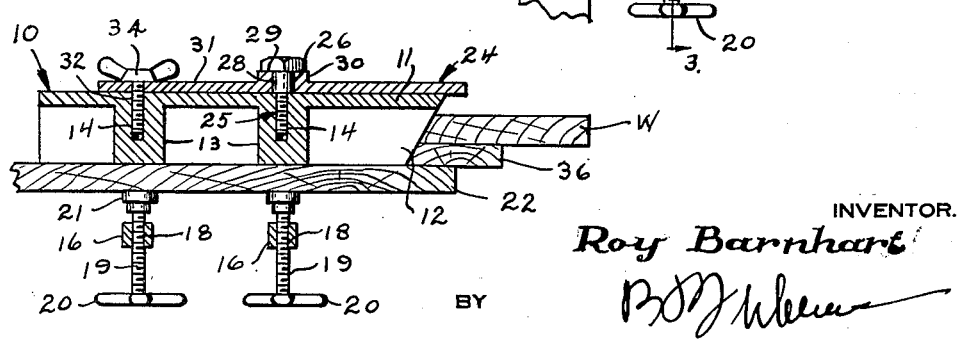

In the accompanying drawings, forming a part of this application, and in which like numerals are employed to designate like parts throughout same, Figure 1 is a plan view of a portable power saw guide embodying my invention, Figure 2 is a side elevation of the same, and, Figure 3 is a vertical section taken on line 3—3 of Figure 2.

In the drawings, where for the purpose of illustration is shown a preferred embodiment of my invention, the numeral 10 designates generally an elongated clamp bar or bracket having an upper flat horizontal plate or web 11 and a flat vertical side plate or web 12, integral therewith and arranged perpendicular to the upper web 11. The clamp bar 10 is provided inwardly of its opposite ends with a pair of longitudinally spaced bosses 13, integral with the webs 11 and 12 and having their bottoms terminating flush with the bottom edge of the vertical web 12. The bosses 13 have vertical screw-threaded openings 14 extending through the top face of the web 11. The screw-threaded openings 14 are arranged in alignment at the transverse center of the clamp bar 10. Formed integral with the horizontal web 11 and bosses 13 are a pair of depending generally L-shaped rigid clamp jaws 15 including transverse horizontal extensions or arms 16, spaced below the bottom edge of the web 12 and below the bosses 13. The extensions 16 are provided in their free ends with vertical screw-threaded openings 18, extending therethrough, and these openings are in substantial vertical alignment with the vertical web 12, as shown. The extensions 16 are spaced apart longitudinally of the clamp bar 10, and disposed directly below the bosses 13. Adjustable clamp screws 19 are mounted within the screw-threaded openings 18, and provided with turning knobs or handles 20 and clamping plates or feet 21, arranged in opposition to the bottoms of the bosses 13 and web 12.

The clamp bracket 10 is secured to one edge of a table 22, work bench or other stationary plank. The bosses 13 and web 12 engage the top face of the table 22, and the extensions 16 project beneath the table, so that the clamp screws 19 may be adjusted upwardly until the feet 21 engage the bottom of the table or plank 22 for tightly securing the clamp bracket 10 in place. With the clamp bracket 10 thus secured to the table, the top face of the horizontal web 11 is spaced above the table, and the outer vertical face of the web 12 is spaced laterally inwardly of and substantially parallel to the adjacent edge of the table 22.

The numeral 24 designates generally a horizontal guide plate which is substantially flat, elongated and rectangular. A pivot screw 25 engages within one screw-threaded opening 14 and has an enlarged cylindrical portion or shank 26, engaging the web 11 and projecting above the same. The enlarged portion 26 of the pivot screw is pivotally received within an opening 28, formed in an elongated relatively narrow raised guide rib 29, formed upon the plate 24 adjacent to one longitudinal edge thereof and extending throughout the entire length of the plate 24. The opening 28 is formed near and inwardly of one end of the guide plate 24, as shown. The top and bottom faces of the guide plate 24 are flat and smooth, and the inner longitudinal edge 30 of the rib 29 is straight and perpendicular to the top face of the plate 24. The guide plate 24 is thus pivotally secured to the clamp bracket 10 by the screw 25, and the guide plate is slidable over the horizontal web 11. The opposite ends of the guide plate 24 are free from raised projections.

The guide plate 24 is provided with a flat horizontal extension or wing 31, integral therewith, and projecting laterally beyond the side of the guide plate having the rib 29. The wing 31 is preferably of the same thickness as the plate 24 proper, and extends from the end of the plate nearest the screw 25 to a point near the longitudinal center of the plate 24. The end of the wing 31 nearest the longitudinal center of the plate 24 is arcuate, and concentric with the screw 25. The wing 31 is provided adjacent to its arcuate end with a concentric arcuate slot 32, extending from a point laterally opposite the pivot screw 25 for approximately 65 degrees counterclockwise, Figure 1. The wing 31 is further provided at its arcuate edge and adjacent to the outer side of the slot 32 with a milled scale 33, graduated in degrees and fractions thereof. This scale 33 is graduated counter-clockwise from zero degrees to 65 degrees, the zero degree graduation being arranged in lateral alignment with the pivot screw 25, while the 65 degree graduation is arranged near the rib 29 and near the longitudinal center of the guide plate 24.

A winged clamp screw 34 extends through the slot 32 and engages in the other screw-threaded opening 14. The head of the winged screw 34 engages the extension 31 for clamping the guide plate 24 in the selected adjusted angular position with respect to the clamp bar 10.

In use, with the clamp bar 10 secured to the support 22 in the manner described, the flat guide plate 24 is positioned in the selected adjusted angular position. The straight edge 30 may be accurately arranged at the desired angle to the outer vertical face of the web 12, by turning the plate 24 about the screw 25 until the desired degree graduation of the scale 33 coincides with a milled scribe line 35, formed on the top face of the web 11. The clamp screw 34 is now tightened, and the guide is ready for use.

The work W is positioned upon the table 22 and shifted longitudinally of the clamp bar 10 while engaging the vertical web 12 thereof. The work W passes beneath the adjacent end of the guide plate 24, as shown, and may rest upon a dummy plank or board 36 so that the support 22 will not be cut by the saw during the severing of the work. It will be observed that the major portion of the guide plate 24 overhangs and extends beyond the vertical face of the web 12, and is spaced above the table 22, in superposed relation therewith. The guide plate 24 is spaced a slight distance above the work W, so that the same may move longitudinally beneath the guide plate while engaging the vertical face of the web 12.

A conventional portable electric saw 37 is employed, and includes a motor casing 38 having a handle 39, and mounted upon a flat rectangular slide plate or shoe 40 having straight parallel side edges 41. The shoe 40 is slidable longitudinally upon the guide plate 24, and one straight edge 41 is held against the straight edge 30 of the raised rib 29. This assures the circular saw blade 42 of movement in a straight line longitudinally of the guide rib 29. The circular saw blade 42 is vertically disposed and arranged slightly beyond the longitudinal edge of the guide plate 24 remote from the rib 29. The saw blade projects below the guide plate, so that it may sever the work W. The saw is manipulated by the handle 39, and when it is shifted toward the end of the guide plate nearest the table 22, the saw blade 42 will cut off the work W at the desired angle. The portable saw 37 is free from positive connection with the guide plate, and therefore bodily removable therefrom.

My guide device may be used with substantially any type portable electric saw equipped with a slide plate or shoe for engagement with a straight edge.

It is to be understood that the form of my invention herewith shown and described, is to be taken as a preferred example of the same and that various changes in the shape, size and arrangement of parts may be resorted to without departing from the spirit of my invention or the scope of the subjoined claim.

Having thus described my invention, I claim:

A guide device for a portable cut-off saw comprising, an elongated horizontal bar which is L-shaped in cross section and includes an upper horizontal web and a vertical web depending below the horizontal web, the vertical web being adapted to be arranged upon a table top near the edge of the table top, a pair of spaced vertical bosses arranged beneath the horizontal web near its ends and formed integral with said bar, said bosses being disposed adjacent to and outwardly of the vertical web, said bosses engaging the table top to prevent the bar from being tilted, said bosses having longitudinal openings extending through their upper ends, L-shaped clamp jaws formed integral with the bosses and including horizontal arms arranged beneath the table top, vertical clamp screws carried by the horizontal arms to engage the lower face of the table top, a horizontal guide plate provided upon its upper face with a longitudinal rib to engage the saw, the guide plate slidably contacting with the horizontal web, a pivot element passing through the rib and held within the vertical opening in one boss, a laterally extending horizontal wing formed integral with the guide plate and having its lower face in the plane of the lower face of the guide plate to slidably contact with the horizontal web, said wing having a curved slot which is concentric with the pivot element, and an adjustable clamping element passing through the curved slot and engaging within the vertical opening of the other boss.

ROY O. BARNHART.

REFERENCES CITED

The following references are of record in the file of this patent:

UNITED STATES PATENTS

| Number | Name | Date |
| --- | --- | --- |
| 1,608,558 | Hannah | Nov. 30, 1926 |
| 1,706,115 | Hannah | Mar. 19, 1929 |
| 1,756,121 | Hedgpeth | Apr. 29, 1930 |
| 1,828,043 | Hedgpeth | Oct. 20, 1931 |
| 1,911,045 | Tinnen | May 23, 1933 |
| 1,960,590 | McKay | May 29, 1934 |
| 2,306,512 | Whitney | Dec. 29, 1942 |